(12) United States Patent
Aquino et al.

(10) Patent No.: US 6,769,831 B2
(45) Date of Patent: Aug. 3, 2004

(54) QUICK-DISCONNECT FASTENER ASSEMBLY FOR INSTALLING STOWAGE BINS AND THE LIKE

(75) Inventors: Roberto C. Aquino, Renton, WA (US); Merlin R. Beason, Everett, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 10/294,137

(22) Filed: Nov. 14, 2002

(65) Prior Publication Data

US 2004/0096263 A1 May 20, 2004

(51) Int. Cl.[7] ............................. F16D 1/00; B64D 11/00
(52) U.S. Cl. ...................... 403/350; 403/83; 244/118.1; 244/118.5
(58) Field of Search .................. 105/245, 293.1–293.3; 224/29.5, 309, 311, 324, 328; 244/118.1, 118.2, 118.5; 248/317; 296/37.7–37.9; 312/245–248, 327, 293.1–293.3, 328; 403/83, 84, 87, 89, 92, 94, 95, 101, 112, 113, 119–121, 350–352, 409.1, DIG. 12

(56) References Cited

U.S. PATENT DOCUMENTS

| | | | | |
|---|---|---|---|---|
| 3,666,214 A | * | 5/1972 | Matuska | ...................... 312/328 |
| 3,700,199 A | * | 10/1972 | Matuska | ................... 244/118.1 |
| 4,799,631 A | * | 1/1989 | Humphries et al. | ...... 244/118.5 |
| 5,108,048 A | * | 4/1992 | Chang | ...................... 244/118.1 |
| 5,549,258 A | | 8/1996 | Hart et al. | |
| 5,687,929 A | | 11/1997 | Hart et al. | |
| 5,716,027 A | | 2/1998 | Hart et al. | |
| 5,839,694 A | * | 11/1998 | Bargull et al. | ............ 244/118.1 |
| 5,842,668 A | * | 12/1998 | Spencer | ................... 244/118.1 |
| 6,062,509 A | | 5/2000 | Burrows et al. | |
| 6,290,175 B1 | | 9/2001 | Hart et al. | |
| 6,318,671 B1 | * | 11/2001 | Schumacher et al. | ..... 244/118.5 |
| 6,484,969 B2 | * | 11/2002 | Sprenger et al. | ......... 244/118.5 |
| 6,691,951 B2 | * | 2/2004 | Frazier | .................... 244/118.1 |

FOREIGN PATENT DOCUMENTS

| | | | |
|---|---|---|---|
| EP | 0 514 957 A1 | * | 4/1992 |
| EP | 1 260 434 A1 | * | 5/2002 |
| EP | 1 306 303 A2 | * | 5/2003 |
| WO | Wo 03/097457 A1 | * | 5/2003 |

* cited by examiner

*Primary Examiner*—Robert J. Sandy
*Assistant Examiner*—Ruth C. Rodriguez
(74) *Attorney, Agent, or Firm*—Alston & Bird LLP

(57) ABSTRACT

A fastener assembly is provided that permits the quick connection and disconnection of various objects, including stowage bins. The fastener assembly includes a tubular connector for engaging a pin. The tubular connector may define a keyhole having a head end and a slot extending circumferentially from the head end. The head end is sized to receive an end portion of the pin and the slot has a width selected to engage the end portion of the pin. Thus, the end portion of the pin may be inserted through the head end and the tubular connector may then be rotated such that the end portion of the pin is engaged within the slot.

10 Claims, 4 Drawing Sheets

QUICK-DISCONNECT FASTENER ASSEMBLY FOR INSTALLING STOWAGE BINS AND THE LIKE

FIELD OF THE INVENTION

The present invention relates generally to a fastener assembly capable of relatively quick engagement and disengagement and, in one embodiment, to a fastener assembly for attaching one or more stowage bins to a structure, such as the frame of an aircraft.

BACKGROUND OF THE INVENTION

Fasteners are utilized in a wide variety of applications as a means of interconnection. For example, fasteners are commonly used to attach various components to a support structure or frame, thereby constructing a more complex assembly. Different types of fasteners have been developed to address the varied requirements of these applications. In this regard, some fasteners have been designed to provide relatively a permanent connection and may therefore require that the fastener be destroyed or otherwise damaged in order to break the connection. Other fasteners have been designed to permit repeated connection and disconnection without having to destroy or otherwise damage the fastener. In designing fasteners that permit repeated connection and disconnection, however, one consideration is generally insuring that the fasteners remain securely engaged following their initial connection until the fasteners are intentionally disconnected. In addition, another consideration is the ease and/or the time required to connect and disconnect the fasteners with it being desirable that the fasteners be simple and require minimal time to connect and disconnect.

In order to permit repeated connection and disconnection, quick disconnect fasteners have been developed. In concert with the foregoing design considerations, these quick disconnect fasteners are generally relatively simple to connect and disconnect and, therefore, typically require little time during installation and removal. In addition, quick disconnect fasteners generally provide a secure connection following installation and prior to their intentional removal. Notwithstanding their advantages, conventional quick disconnect fasteners have not been suitable or otherwise utilized for all applications that require that the fasteners be capable of being disconnected in order to permit, for example, removal, replacement or other disassembly of a component.

One application that utilizes fasteners that must generally be capable of being disconnected is the installation of stowage bins. Stowage bins are utilized in a wide variety of applications for temporarily storing various articles. For example, aircraft include a number of stowage bins for stowing the personal effects of the passengers during flight. The stowage bins are generally arranged within an aircraft in two or more longitudinally extending rows. In this regard, for an aircraft having a center aisle, for example, stowage bins are generally mounted overhead in two rows along each of the opposed sides of the aircraft.

The stowage bins are generally securely affixed to a supporting structure such that the stowage bins remain fixed in position. With respect to the stowage bins of an aircraft, the stowage bins are generally connected to the frame of the aircraft. In this regard, the upper and/or outer sides of the stowage bins may be connected to the frame of the aircraft by means of one or more tie rods such that the stowage bins are secured in position.

In order to attach the tie rod(s) to the stowage bins, each stowage bin generally includes at least one fitting. For example, a stowage bin may include a fitting mounted proximate each end of the bin in an aligned relationship to a fitting mounted on an adjacent stowage bin. Each fitting may define an opening such that the fittings of adjacent stowage bins may be connected by means of a fastener, such as a bolt or the like. The opposed ends of the tie rods generally also define openings. Thus, the tie rods may be attached to the stowage bins by extending the bolts through the opening defined by one end of each tie rod. As a result, the tie rods are generally mounted upon the shank of the bolt between the fittings of adjacent stowage bins.

Since an aircraft generally includes a substantial number of stowage bins, such as 20, 30 or more stowage bins, the installation of the stowage bins including the attachment of the stowage bins to the frame of the aircraft is a time-consuming process. In particular, the tightening of a nut on each bolt typically requires a significant time. The time required to install the stowage bins is further exacerbated by the limited space available to insert and tighten the nuts and bolts utilized to secure the stowage bins.

In some applications, it may be desirable to eventually replace the stowage bins. For those stowage bins installed within an aircraft, for example, the interior of the aircraft may occasionally be refurbished and new or at least different stowage bins installed. As a result of the manner in which the stowage bins are secured to the frame of the aircraft, such as by means of bolts, the detachment of the stowage bins and the subsequent reattachment of different stowage bins requires even more time and labor and therefore disadvantageously increases the cost of the refurbishment of the interior of the aircraft.

It would therefore be desirable to develop an improved quick disconnect fastener. While an improved disconnect fastener would be useful in a variety of applications, an improved disconnect fastener would be desirable for attaching stowage bins to a supporting structure, such as the frame of an aircraft. For example, it would be desirable to develop an improved quick disconnect fastener for attaching stowage bins that decreases the time required to attach the stowage bins to the supporting structure and that more readily permits the stowage bins to be detached and replaced, such as during the process of retrofitting the interior of an aircraft or the like.

SUMMARY OF THE INVENTION

An improved quick disconnect fastener assembly is therefore provided according to one embodiment of the present invention. The quick disconnect fastener can be utilized for a variety of applications, including the installation of stowage bins. While the fastener assembly of the present invention would securely hold the stowage bins in position following installation, the quick disconnect fastener assembly of the present invention also permits the stowage bins to be detached and replaced with other stowage bins, if desired, such as during a refurbishment of the interior of an aircraft or the like. Thus, the time and associated expense expended to install stowage bins are therefore advantageously reduced by utilizing the quick disconnect fastener assembly of the present invention.

In one aspect of the present invention, an improved fastener assembly is provided that is advantageously capable of being quickly disconnected. The fastener assembly includes a tubular connector for engaging a pin. In one embodiment, the pin includes an end portion proximate a distal end of the pin and an engagement portion proximate the end portion of the pin and spaced from the distal end of the pin. The engagement portion of the pin is smaller in lateral cross-section than the end portion of the pin. For example, the engagement portion of the pin may be a circumferential groove defined proximate the end portion of the pin. The pin may also include a head opposite the end portion.

According to one aspect of the present invention, the tubular connector defines a keyhole having a head end and a slot extending circumferentially from the head end. The head end is sized to receive the end portion of the pin and the slot has a width that is smaller than the end portion of the pin, but at least as large as the engagement portion of the pin. Thus, the end portion of the pin may be inserted through the head end into the interior of the tubular connector. The tubular connector may then be rotated relative to the pin such that the engagement portion of the pin slides through the slot. Following this rotation of the tubular connector, the pin cannot be disengaged from the tubular connector without rotating the tubular connector in the opposite direction so as to again align the pin with the head end of the keyhole. Thus, the tubular connector can be mounted upon the end portion of the pin in a relatively quick manner. By extending the pin through appropriate fittings or the like and then securing the pin in position with the tubular connector, the fastener assembly of the present invention permits the quick connection and disconnection of a variety of objects, including a stowage bin and the frame of an aircraft, by engaging and disengaging, respectively, the pin and the tubular connector.

The tubular connector includes a tubular body defining the keyhole. As indicated above, the slot of the keyhole has a width that is smaller than a corresponding dimension of the head end, thereby permitting the end portion of the pin to be inserted through the head end and, following rotation of the tubular connector, to be retained within the tubular body. A tubular body typically defines the keyhole to extend circumferentially through an angle of at least 90° and, in some embodiments, at least 120°.

The tubular connector also includes an engagement member extending inwardly into the tubular body. For example, the engagement member may include an inwardly projecting dimple or flap. The engagement member is aligned with and spaced circumferentially from the keyhole and, in one embodiment, is aligned with a medial portion of the slot. Thus, the end portion of the pin may be inserted through the head end of the keyhole. During subsequent relative rotation of the tubular connector with respect to the pin, the distal end of the pin generally contacts the engagement member. Further relative rotation of the tubular connector with respect to the pin forces the distal end of the pin to move beyond the engagement member. However, the engagement member then serves to restrict relative rotation of the tubular connector and the pin in the opposite direction, thereby preventing inadvertent disengagement of the tubular connector from the pin. However, the tubular connector can be removed from the pin if sufficient force is applied which again will cause the distal end of the pin to move past the engagement member.

The fastener assembly may also include a sleeve mounted upon at least a portion of the tubular connector. Typically, the sleeve is formed of a material that is less abrasive than the tubular connector. As such, the sleeve reduces the abrasion that may otherwise occur between the tubular connector and the fitting. In addition, the sleeve may dampen any noise that otherwise would be generated by contact between the tubular connector and the fitting. In order to facilitate the relative rotation of the tubular connector with respect to the pin, the tubular connector and the sleeve may both define respective aligned apertures. As such, a screwdriver, an awl or another elongate member may be inserted through the openings and utilized as a handle to rotate the fastener assembly relative to the pin.

As described, the fastener assembly can provide for the quick connection and disconnection of a variety of objects. For example, the fastener assembly can provide for the quick connection and disconnection of various components to a frame, such as the quick connection and disconnection of at least one stowage bin to an aircraft frame or the like. In this application, the stowage bin may have a fitting defining an opening therethrough. Typically, the stowage bin is one of a plurality of stowage bins, generally arranged in a row, such that first and second adjacent stowage bins have respective fittings that define aligned openings. The pin may therefore extend through the opening(s) defined by the fitting(s). The stowage bin assembly also includes a connecting member, such as a tie rod, mounted upon the pin for attaching the stowage bin to a structure, such as the frame of an aircraft or the like.

As such, the fastener assembly permits stowage bins to be installed in a more expeditious manner. Once installed, the stowage bin assembly and associated fastener assembly securely hold the stowage bins in position. However, the fastener assembly can permit the stowage bins to be readily detached and different stowage bins installed, if desired, such as during the refurbishment of the interior of an aircraft or the like.

BRIEF DESCRIPTION OF THE DRAWINGS

Figure 1:
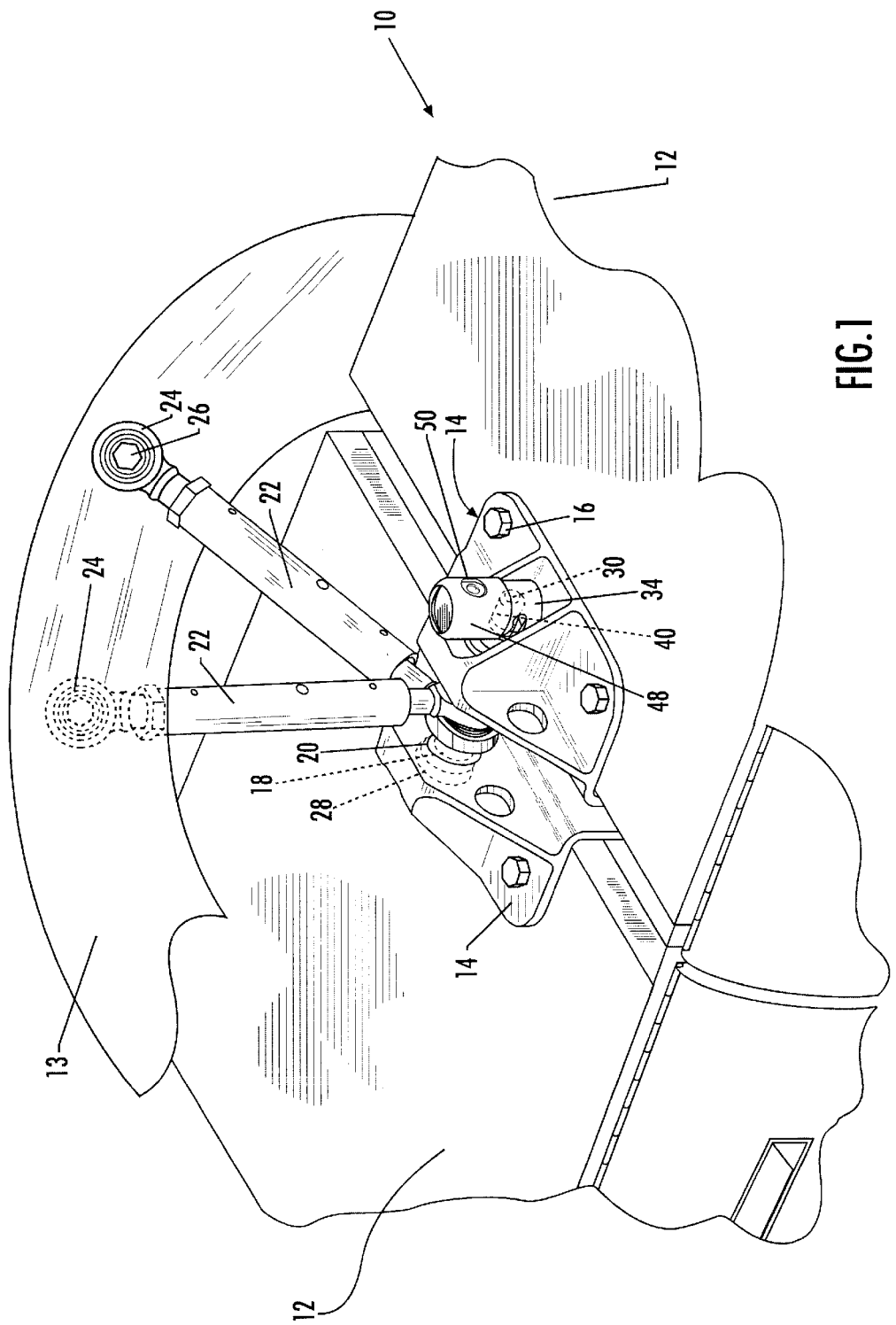
Figure 2:
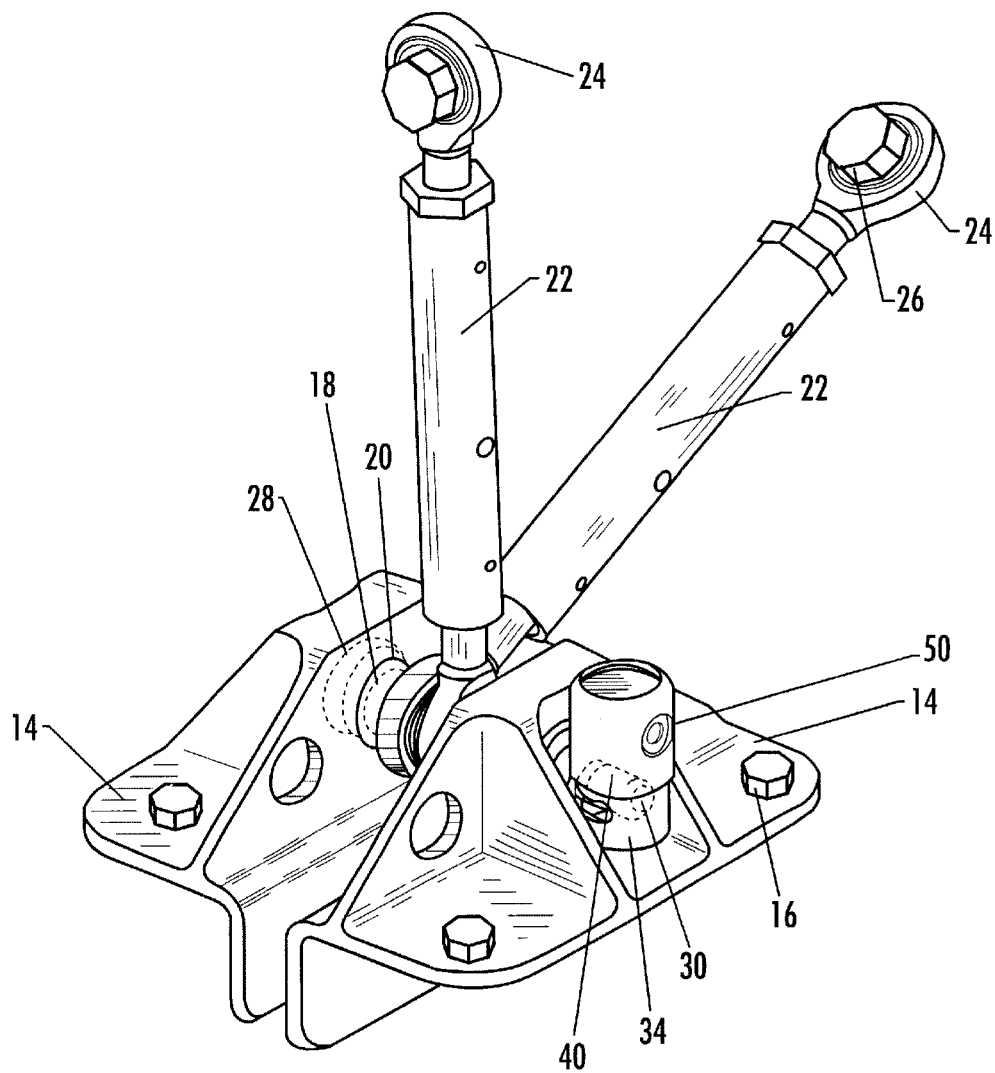
Figure 3:
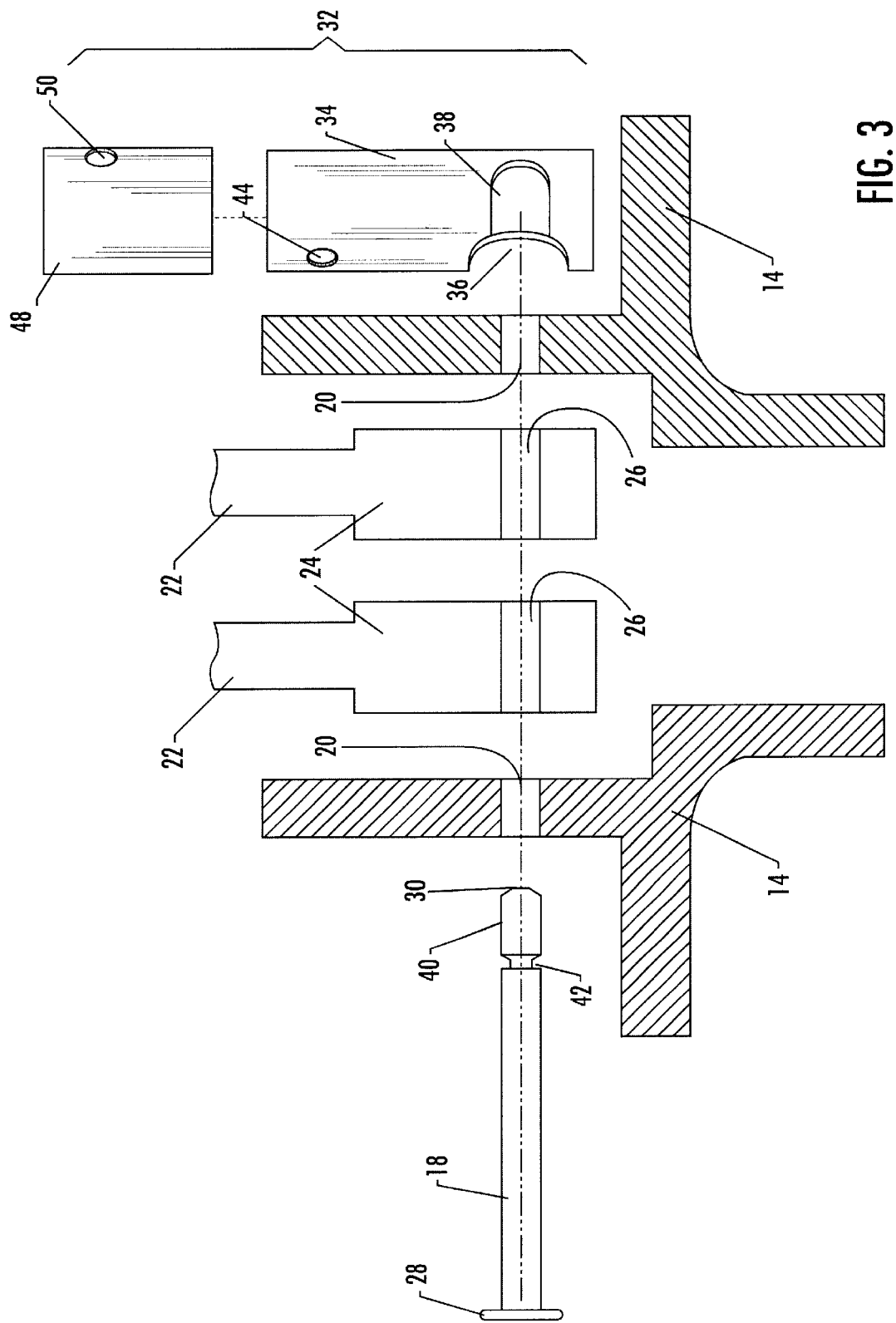
Figure 4:
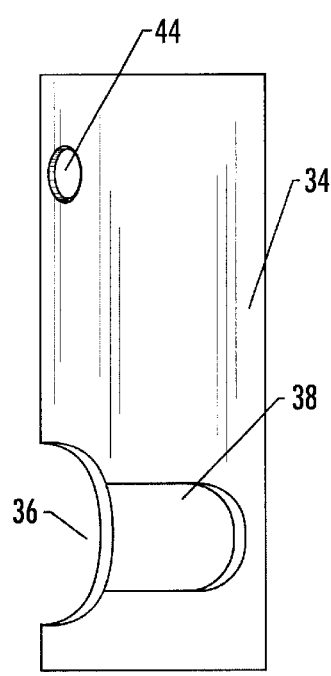
Figure 5:
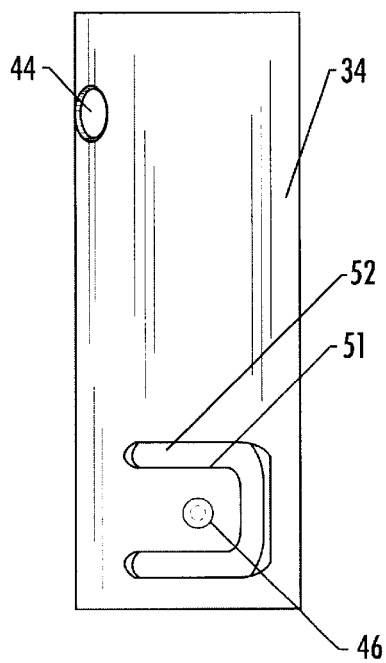
Figure 6A:
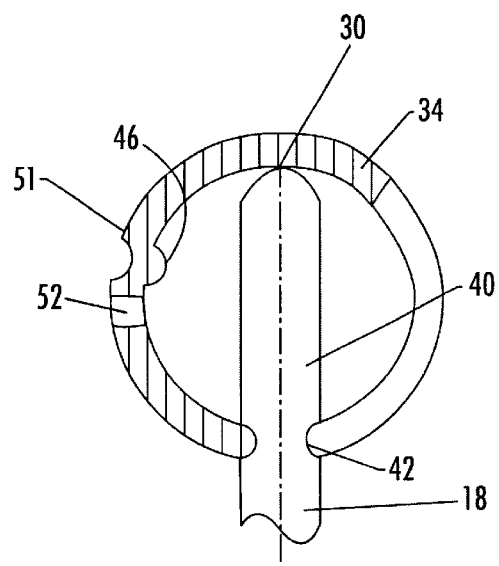
Figure 6B:
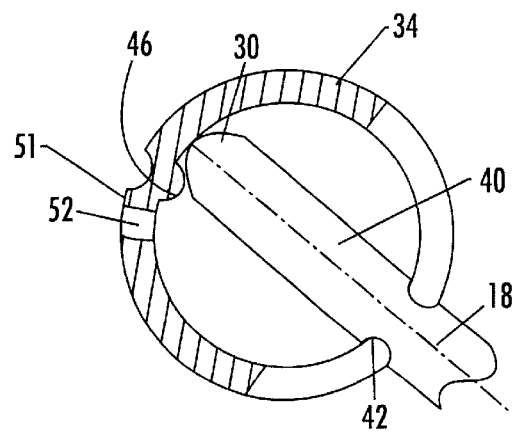
Figure 6C:
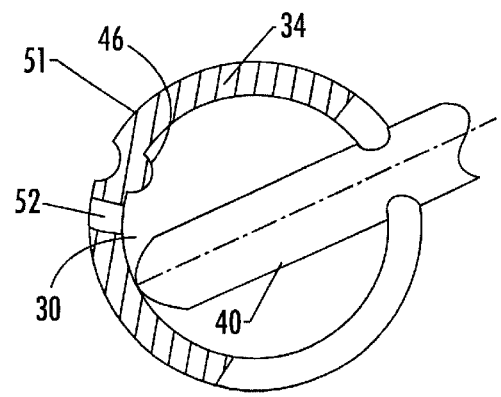

Having thus described the invention in general terms, reference will now be made to the accompanying drawings, which are not necessarily drawn to scale, and wherein:

FIG. 1 is a perspective view of a stowage bin assembly according to one embodiment of the present invention that is mounted to a supporting frame;

FIG. 2 is a perspective view of the stowage bin assembly of FIG. 1;

FIG. 3 is an exploded section view of the stowage bin assembly of FIG. 1;

FIG. 4 is a side view of the tubular connector of one embodiment of the present invention;

FIG. 5 is a side view of a tubular connector according to another embodiment of the present invention; and FIGS. 6A–6C are cross-section views taken along the centerline of the slot and illustrating a sequence of operations following insertion of a distal end of a pin into the tubular connector of FIG. 3.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A fastener assembly 32 is provided for permitting the quick connection and disconnection of various objects. As described below, for example, the fastener assembly may securely connect one or more stowage bins 12 to the frame of an aircraft or the like. However, the fastener assembly may be utilized to quickly connect and disconnect a wide variety of other objects without departing from the spirit and scope of the present invention.

The fastener assembly 32 includes a tubular connector 34 for engaging a pin 18. By extending the pin through respective fittings of two or more objects or by otherwise extending the pin through corresponding openings defined by two or more objects, the pin can be secured in position and the objects can be connected together by engaging the pin with the tubular connector. In order to illustrate one of many potential applications for the fastener assembly, the fastener assembly will now be described in detail in conjunction with the installation of stowage bins 12, such as within an aircraft.

Referring now to FIG. 1, a stowage bin assembly 10 is depicted. As described hereinbelow for purposes of example, the stowage bin assembly is mounted within an aircraft and, in particular, is mounted to the frame of an aircraft. However, the stowage bin assembly may be utilized in a wide variety of other applications and, as such, may be mounted to other types of supporting structures.

As shown in FIG. 1 and in more detail in FIGS. 2 and 3, the stowage bin assembly 10 includes at least one stowage bin 12. Typically, a plurality of stowage bins, such as 20, 30 or more stowage bins are mounted in a row, such as overhead along one side of an aircraft. As such, the stowage bin assembly of the illustrated embodiment includes first and second stowage bins that are commonly connected to the supporting structure 13. However, the stowage bins may be individually and separately connected to the supporting structure, if so desired.

The stowage bins 12 include a fitting 14 that will serve as a point of attachment. The stowage bins may be designed such that the fitting is integral. Alternatively, the fitting may be a discrete component that is attached to the stowage bins. In the illustrated embodiment, for example, the fitting is a discrete component attached to one end of the stowage bin. While the fitting may have a variety of configurations, the fitting of the illustrated embodiment has a generally L-shaped for extending about the corner of the respective stowage bin. In the illustrated embodiment, the fitting is advantageously attached to one end of the stowage bin to permit the pair of adjacent stowage bins to be commonly connected to the supporting frame. However, the fittings may be attached to other portions of the stowage bin, particularly in those embodiments in which the stowage bins are individually and separately connected to the supporting frame. In the illustrated embodiment, however, the fitting is mounted to a corner of the stowage bin defined by the upper surface of the stowage bin and one of the opposed ends of the stowage bin such that the fittings of adjacent stowage bins are in an aligned relationship with respect to one another. In those embodiments in which the fittings are discrete components, the fittings may be attached to the respective stowage bins by means of fasteners 16. Although a variety of fasteners may be utilized, one exemplary fastener is a HI-LOK™ fastener commercially available from Hi-Shear Corporation of Torrance, Calif.

The stowage bin assembly 10 also includes the pin 18 that extends through an opening 20 defined by the fitting 14 and engages one or more connecting members 22. In the illustrated embodiment in which first and second stowage bins 12 are commonly connected to the supporting frame (not shown), the pin extends through respective openings defined by the fittings carried by both the first and second stowage bins. While the pin can engage the connecting member(s) in a variety of manners, the connecting member of one embodiment is a tie rod having a lengthwise extending, generally cylindrical body with opposed end portions 24 that define respective openings 26. Thus, the tie rod may be positioned such that one end portion is disposed between the fittings carried by the first and second stowage bins, thereby permitting the pin to extend through the opening defined by the end portion of the tie rod, in order to engage the tie rod. In the illustrated embodiment, the stowage bin assembly includes first and second connecting members that are similarly engaged by the same pin. However, the stowage bin assembly may include any number of connecting members and connecting members having other shapes and configurations without departing from the spirit and scope of the present invention. Although not shown, one or more sleeves may be provided that are disposed within the opening(s) defined by connecting members, and through which the pin extends to facilitate relative movement therebetween.

The pin 18 defines a lengthwise axis and extends between opposed ends. Typically, one end of the pin includes a head 28 that is larger than the opening 20 defined by the fitting 14 through which the shank of the pin extends. Thus, the head effectively limits the insertion of the pin through the aligned openings defined by the fittings. The opposed distal end 30 of the pin, as well as the shank of the pin, are sized to extend through the aligned openings defined by the fittings. In addition, the pin has a sufficient length such that the distal end of the pin extends completely through the opening(s) defined by the fitting(s). To facilitate the insertion of the pin, the distal end may be chamfered, as shown.

According to the present invention, the fastener assembly 32 is designed to engage the pin 18 as described above. In particular, the tubular connector 34 of the fastener assembly receives the distal end 30 of the pin and for engages the pin. As shown in FIG. 4, the tubular connector includes a tubular body, which, in the illustrated embodiment, has a cylindrical configuration. However, the tubular body may have other shapes, if so desired. The tubular connector defines a keyhole having a head end 36 and a slot 38 extending circumferential ally from the head end. As shown, the slot has a width that is smaller than the corresponding dimension of the head end. In instances in which the head end is a circular aperture, the width of the slot is less than the diameter of the head end.

The keyhole is sized and shaped to engage the pin 18. In this regard, the pin includes an end portion 40 proximate the distal end 30 of the pin. The pin also includes an engagement portion 42 proximate the end portion of the pin and spaced from the distal end of the pin. The engagement portion of the pin is smaller in lateral cross-section than the end portion of the pin. While the engagement portion may comprise an axially extending portion of the pin, the pin of the illustrated embodiment defines a circumferentially extending groove proximate the end portion of the pin that serves as the engagement portion. The keyhole defined by the tubular connector is sized relative to the end portion and engagement portion of the pin. In this regard, the head end 36 of the keyhole is sized to receive the end portion of the pin. In contrast, the width of the slot 38 is smaller than the end portion of the pin. However, the width of the slot is at least as large as the engagement portion of the pin.

Thus, the end portion 40 of the pin 18 may be extended through the head end 36 of the keyhole so as to be completely disposed with the tubular connector 34. In this regard, the tubular connector and the end portion of the pin are sized such that the entire end portion of the pin may be received within the tubular connector. The tubular connector may then be rotated relative to the pin such that the engagement portion 42 of the pin slides through the slot 38. Following the relative rotation of the tubular connector and the pin, the pin cannot be withdrawn from the tubular connector since the end portion of the pin is larger than the width of the slot. Instead, the relative rotation between the tubular connector and the pin would have to be reversed such that the pin was again aligned with the head end of the keyhole before the end portion of the pin could be withdrawn through the head end of the keyhole.

Thus, the tubular connector 34 can be readily mounted upon the end portion 40 of the pin 18 so as to securely engage the pin. In this regard, the pin is extended through the openings 20, 26 defined by the respective fittings 14 and one or more connecting members 22. The tubular connector is then positioned such that the end portion of the pin extends through the head end 36 of the keyhole. The tubular connector is then rotated relative to the pin such that the engagement portion 42 of the pin slides through the slot 38 of the keyhole. Absent a reversal of the relative rotation between the tubular connector and the pin, the pin is therefore securely engaged. Accordingly, the connecting member(s) will be similarly securely engaged to the fittings and, in turn, to the stowage bins 12. If not already connected, the opposed end portions 24 of the connecting member(s) may then be connected to the supporting frame or the like, such as by means of bolts or other fasteners, so as to complete the process of mounting the stowage bin(s).

To assist in the relative rotation of the tubular connector 34 with respect to the pin 18, the tubular connector can also define at least one and, more generally, a pair of openings 44. In embodiments in which the tubular connector defines a pair of openings, the openings extend through opposite sides of the tubular connector in alignment with one another. Thus, a screwdriver, an awl or other elongate member can be inserted through the openings and utilized as a handle in order to rotate the tubular connector.

In order to retain the tubular connector 34 in position relative to the pin 18 following the relative rotation of the tubular connector and the pin, the tubular connector may include an engagement member 46 extending inwardly from the tubular body. As shown in FIG. 5, the engagement member may be an inwardly projecting flap comprised of an integrated leaf spring 51 separated from the remainder of the tubular connector by a U-shaped slit 52. Alternatively, as shown in FIGS. 6A–6C, the engagement member may include an inwardly projecting dimple. Regardless of the configuration of the engagement member, the engagement member is aligned with and spaced circumferentially from the keyhole. More specifically, the engagement member is generally aligned with, i.e., offset by 180° from, a medial portion of the slot 38 of the keyhole.

The tubular connector 34 is sized such that a distal end 30 of the pin 18 contacts the engagement member 46 as the tubular connector is rotated relative to the pin. In this regard, the inner diameter of a cylindrical tubular body is preferably slightly larger than the axial length of the end portion 40 of the pin including the distal end of the pin. However, the end portion of the pin including the distal end of the pin is slightly longer than the interior distance between the engagement member and that portion of the inner sidewall of the tubular body located 180° from the engagement member.

As illustrated in FIG. 6A, the tubular connector 34 is initially mounted upon the end portion 40 of the pin 18 such that the end portion of the pin extends through the head end 36 of the keyhole. In this state, the distal end 30 approaches, but does not contact the inner sidewall of the tubular body. Thereafter, the tubular connector is rotated relative to the pin such that the engagement portion 42 of the pin slides through the slot 38 of the keyhole. During the relative rotation, the distal end of the pin will contact the engagement member 46 of the tubular connector as shown in FIG. 6B. With the application of additional rotational force to urge the further rotation of the tubular connector with respect to the pin, the pin will be pushed past the engagement member and the relative rotation of the tubular connector with respect to the pin will be completed with the pin generally seated in the distal end of the keyhole, opposite the head end of the keyhole. See FIG. 6C.

While the impediment provided by the engagement member 46 of the tubular connector 34 can be overcome with the application of additional force, the engagement member does provide a limit upon the inadvertent rotation of the tubular connector relative to the pin 18. In this regard, the engagement member effectively prevents the tubular connector from rotating in the reverse direction relative to the pin following the installation of the stowage bins 12 without the application of sufficient force to overcome the impediment provided by the engagement member. Thus, the stowage bins could be detached by purposefully rotating the tubular connector relative to the pin and, in the process, applying sufficient rotational force to overcome the impediment provided by the engagement member of the tubular connector. However, the engagement member effectively prevents the vibrational and/or other small forces to which the tubular connector may be subjected during use from causing the tubular connector to rotate relative to the pin. Thus, the tubular connector securely engages the pin such that the connecting member(s) mounted upon the pin can securely connect the stowage bins to the supporting structure.

The fastener assembly 32 may include not only the tubular connector 34, but also a sleeve 48 mounted upon at least a portion of the tubular connector. As shown in FIGS. 1–3, the sleeve is generally mounted upon one end of the tubular connector so as not to cover or otherwise limit accessibility to the keyhole. The sleeve is preferably slid upon the tubular connector and may be adhered thereto with any conventional epoxy. The sleeve is generally formed of a material that is less abrasive than the material that forms the tubular connector. For example, the tubular connector is typically formed of a metal, such as stainless steel, and the sleeve may be formed of fiberglass. As such, the sleeve will reduce any abrasion that may occur between the tubular connector, the fitting 14 or other nearby component relative to the abrasion that may otherwise occur in instances in which the tubular connector is exposed without the sleeve. In addition, the sleeve is preferably formed of a material that somewhat damps any noise that may occur during operation, such as due to vibration of the tubular connector or the like. In the embodiment in which the tubular connector defines at least one and, more typically, a pair of holes for receiving a screwdriver, an awl, or other elongate member, the sleeve also defines corresponding openings 50 as shown in FIG. 3.

If not already connected to the supporting structure, once the tubular connector 34 has engaged the pin 18, the connecting member(s) 22 may be connected to the supporting frame. As such, the stowage bins 12 can be readily installed, thereby reducing the time and expense required for installation. In addition, the stowage bins may be installed utilizing the fastener assembly 32 of the present invention in areas with restricted access, if necessary. In instances in which the stowage bins are to be detached, such as in instances in which the stowage bins are being replaced, the tubular connector can be rotated in the reverse direction relative to the pin 18 with sufficient force so as to overcome the impediment provided by the engagement member 46 of the tubular connector. Once the pin is aligned with the head end 36 of the keyhole defined by the tubular connector, the tubular connector can be removed from the pin, the pin removed from the openings 20 defined by the fittings 14 and the stowage bins correspondingly disconnected from the connecting member(s) and, in turn, the supporting structure. Thereafter, new or different stowage bins may be mounted in the same fashion as described above. As such, the refurbishment or other replacement of the stowage bins is also expedited through the use of the fastener assembly 32 of the present invention. Moreover, while the fastener assembly of the present invention is described in conjunction with the installation of stowage bins, the fastener assembly may be utilized in other applications, such as those in which quick connection and disconnection are advantageous, without departing from the spirit and scope of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A stowage bin assembly comprising:
   at least one stowage bin having a fitting defining an opening therethrough;
   a pin defining a lengthwise axis and extending through the opening defined by the fitting, said pin comprising an end portion proximate a distal end of said pin and an engagement portion proximate the end portion of said pin and spaced from the distal end of the said pin, wherein the engagement portion of said pin is smaller in lateral cross-section than the end portion of said pin;
   a connecting member mounted upon said pin for attaching said at least one stowage bin to a structure; and
   a tubular connector for engaging said pin, said tubular connector defining a keyhole having a head end and a slot extending circumferentially from the head end, the head end sized to receive the end portion of said pin and the slot having a width that is smaller than the end portion of said pin and at least as large as the engagement portion of said pin.

2. A stowage bin assembly according to claim 1 wherein said tubular connector comprises an inwardly extending engagement member that is aligned with and spaced circumferentially from the keyhole.

3. A stowage bin assembly according to claim 2 wherein said engagement member comprises an inwardly projecting dimple.

4. A stowage bin assembly according to claim 2 wherein said engagement member comprises an inwardly projecting flap.

5. A stowage bin assembly according to claim 1 wherein said tubular connector defines a keyhole extending circumferentially through an angle of at least 90°.

6. A stowage bin assembly according to claim 1 wherein said tubular connector defines a keyhole extending circumferentially through an angle of at least 120°.

7. A stowage bin assembly according to claim 1 wherein the engagement portion of said pin is a circumferential groove defined proximate the end portion of said pin.

8. A stowage bin assembly according to claim 1 wherein said pin comprises a head opposite the end portion.

9. A stowage bin assembly according to claim 1 wherein said at least one stowage bin comprises first and second adjacent stowage bins having respective fittings that define aligned openings.

10. A stowage bin assembly according to claim 1 further comprising a sleeve mounted upon said tubular connector.

* * * * *